Feb. 25, 1930.                C. OTTO                1,748,143
                    METHOD FOR HEATING COKE OVENS
                    Filed Jan. 26, 1926      5 Sheets-Sheet 1
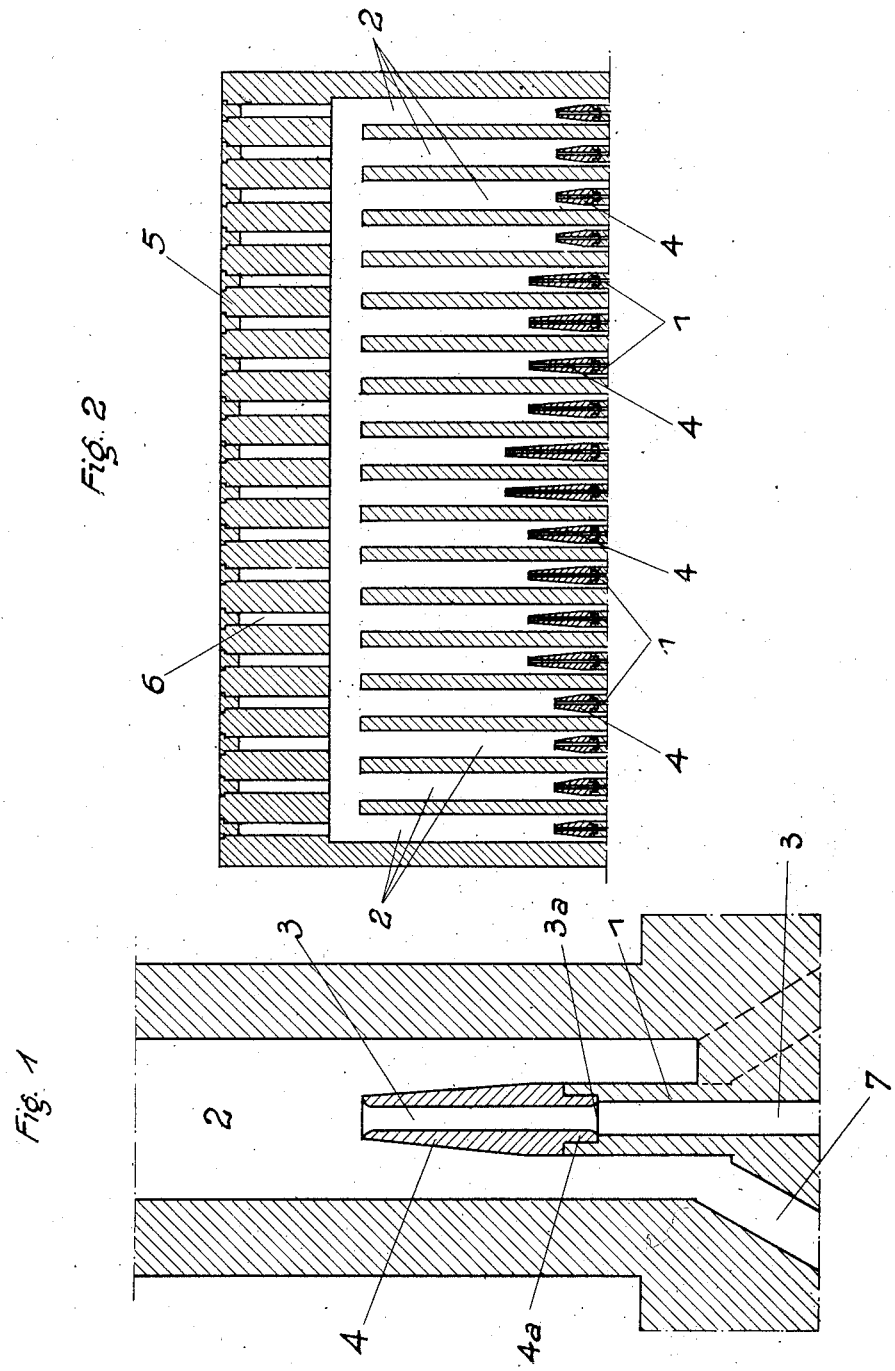
INVENTOR
Carl Otto
BY W. F. Bising
ATTORNEY Feb. 25, 1930.  C. OTTO  1,748,143
METHOD FOR HEATING COKE OVENS
Filed Jan. 26, 1926  5 Sheets-Sheet 2
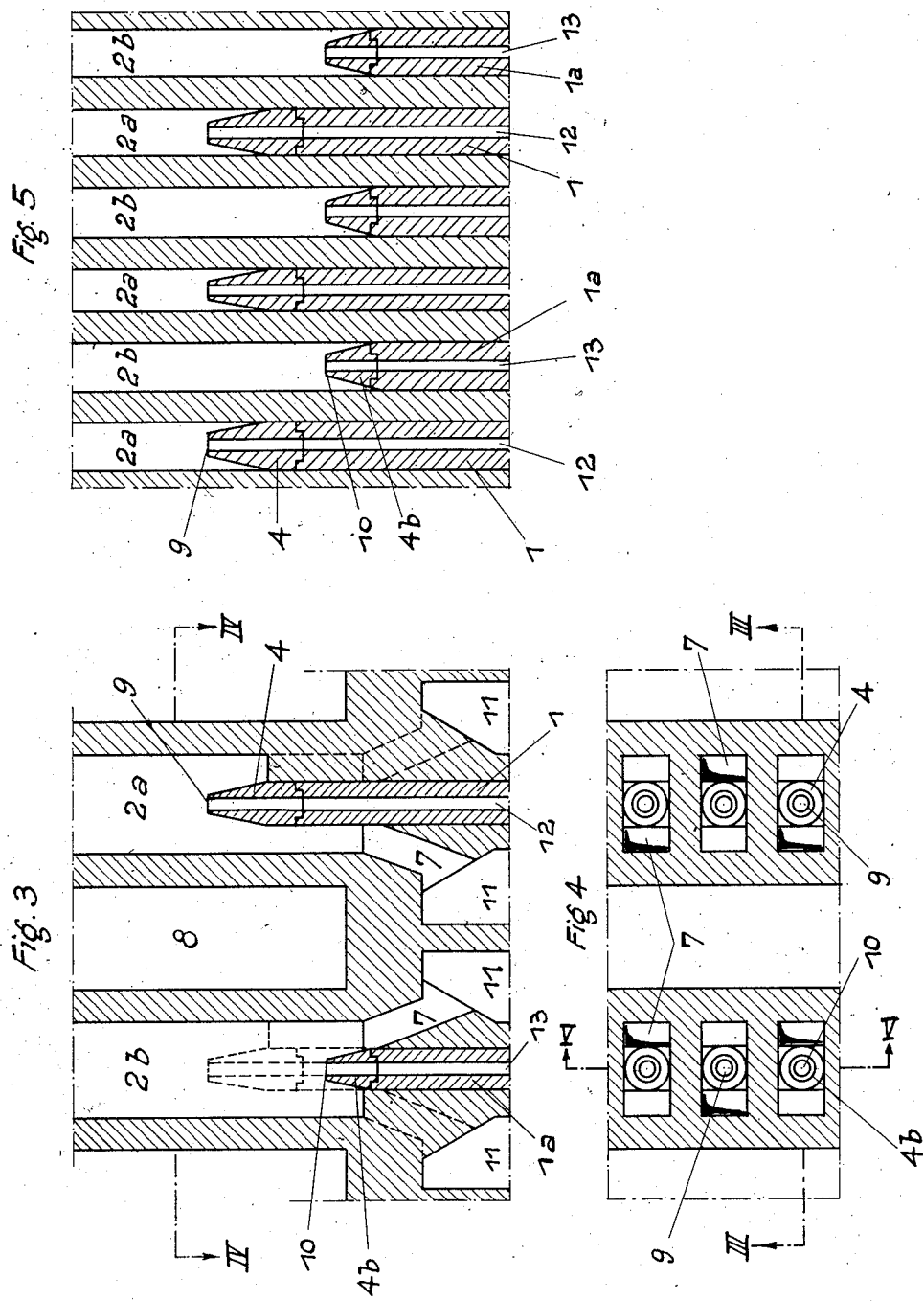
INVENTOR
Carl Otto
BY
W. F. Bining
ATTORNEY Feb. 25, 1930. C. OTTO 1,748,143
METHOD FOR HEATING COKE OVENS
Filed Jan. 26, 1926 5 Sheets-Sheet 3
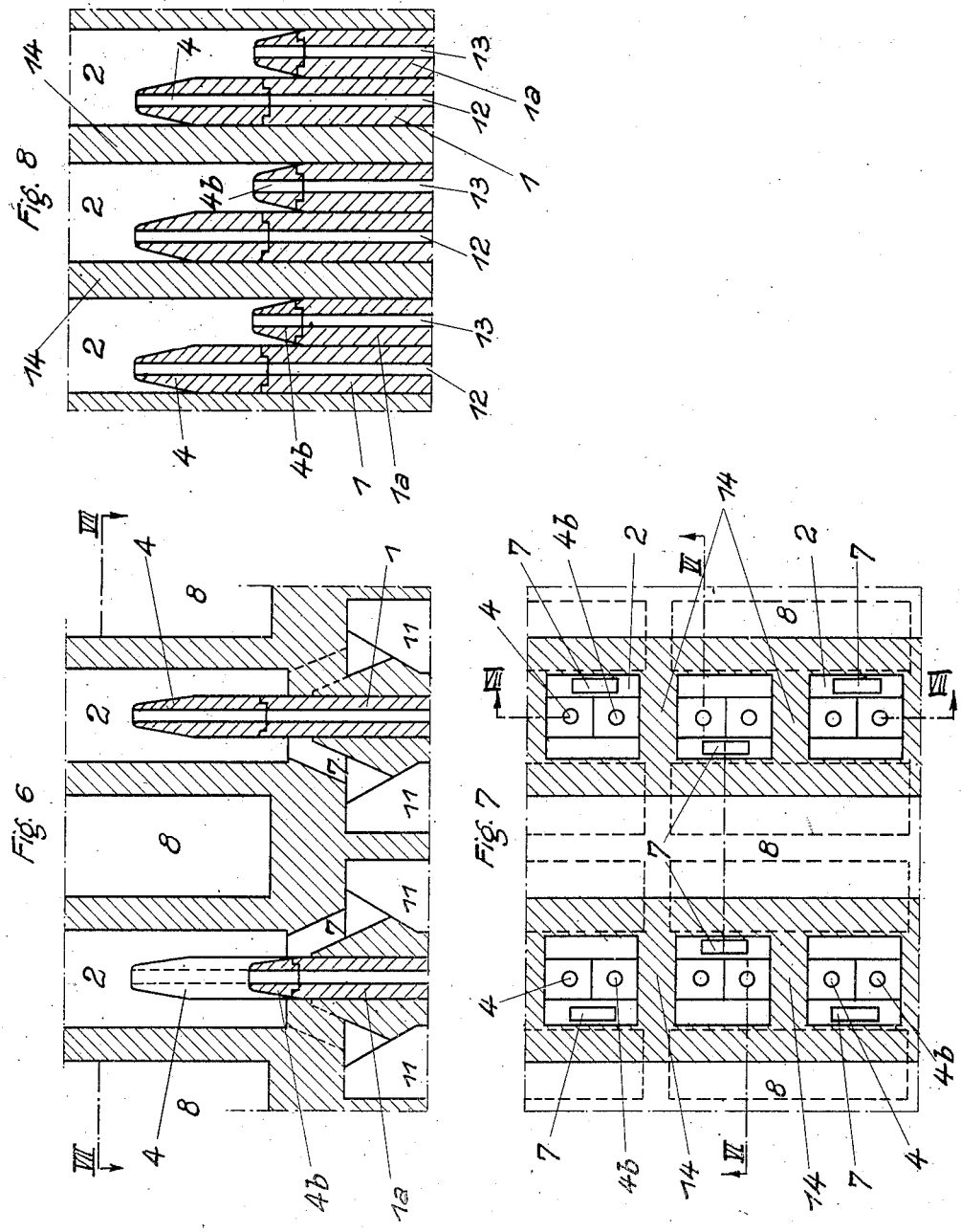

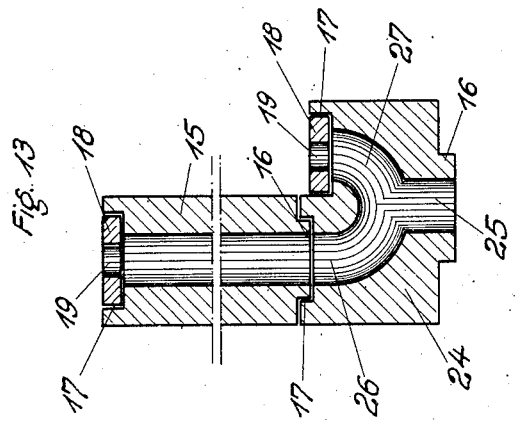
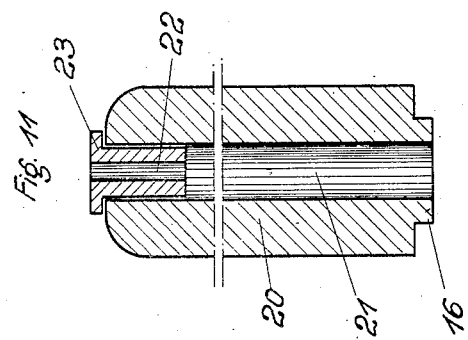
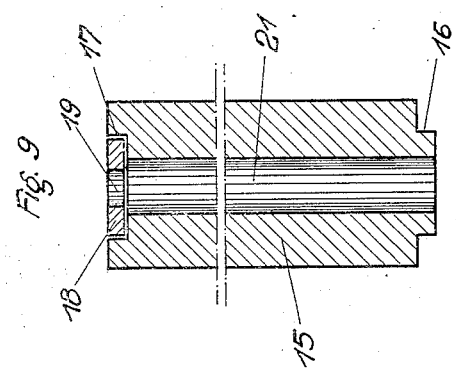
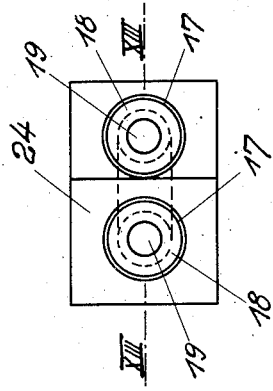
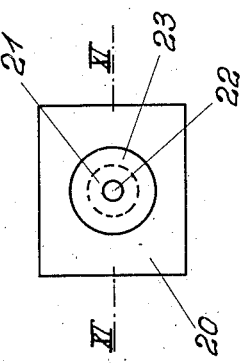
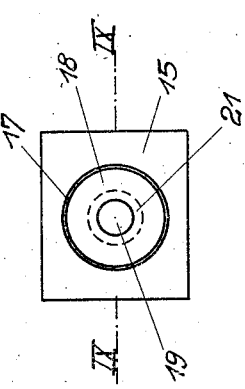

Feb. 25, 1930.　　　　C. OTTO　　　　1,748,143
METHOD FOR HEATING COKE OVENS
Filed Jan. 26, 1926　　5 Sheets-Sheet 5
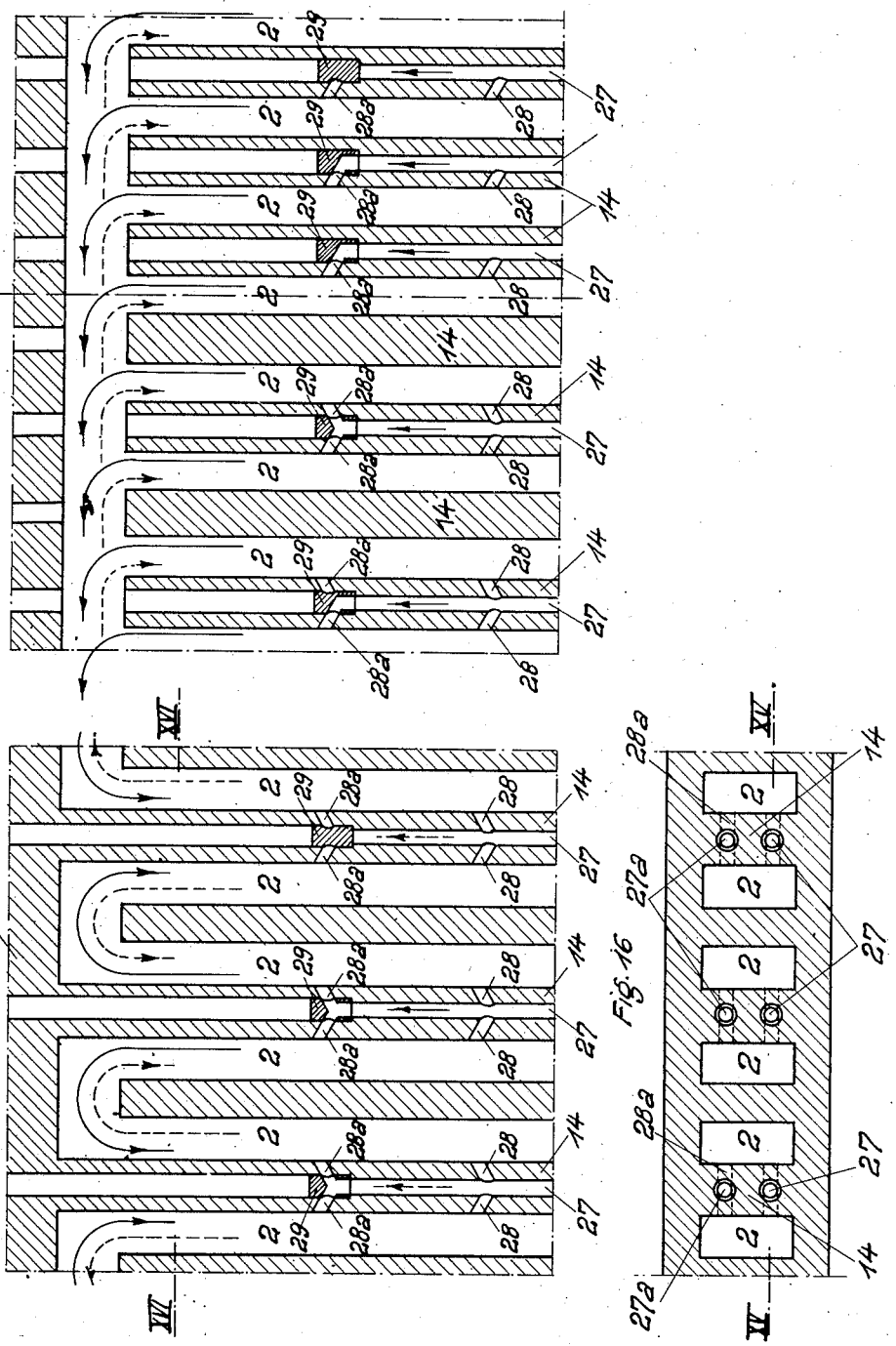
INVENTOR
Carl Otto
BY
W. F. Bissing
ATTORNEY Patented Feb. 25, 1930

1,748,143

UNITED STATES PATENT OFFICE

CARL OTTO, OF ESSEN-ON-THE-RUHR, GERMANY

METHOD FOR HEATING COKE OVENS

Application filed January 26, 1926, Serial No. 83,964, and in Germany February 4, 1925.

It is a matter of importance to uniformly heat the walls of coke ovens, in order to produce a uniform rate of coking in the oven. With high ovens the lower portion thereof ordinarily works hotter than the upper portion. Therefore it was heretofore necessary to continue to heat this lower portion until the upper portion of the charge had also been coked. Consequently an unnecessarily increased heat consumption took place in said lower portion of the oven. When such a coke cake is prematurely pushed out, then the lower portion thereof is found to be overcoked, while towards the top the cake still looks black.

It has been proposed for instance, in order to attain a uniform temperature throughout the entire surface of the wall of high ovens, that is to say, ovens having chambers 3 to 4 meters high, to alternately shorten the flues or to provide an additional heating from the top of the oven. In such cases, however, the burner tips are flush with the soles of the heating flues and the level of the burning points above the floor of the oven if at first arranged in a predetermined manner cannot be afterwards altered.

In accordance with my invention, I provide a method and means of heating coke ovens whereby the above disadvantages are overcome and a uniform rate of coking is effected, without material change to the oven construction; it being possible to utilize my method with various types of coke ovens. Uniform rate of coking is secured regardless of the quality of coal being coked or the composition of the gas being used to heat the oven, by arranging the burning point that is the place where the heating gas and the air for combustion join together, within the flue of the heating wall at a higher or lower level above the bottom of the heating flues. In coking dry coal for instance experience has shown that the burning point must be situated at a very high level, while in coking washed coke coal of a water content of 12 percent for instance, the burning point is to be situated at a considerably lower level. Furthermore, different sorts of coal deliver heating gases of very different composition; with higher contents of hydrogen short combustion flames will occur and the burning point is then to be arranged as highly as possible, while with fat rich gases long flames are formed so that a lower position of the burning point must be aimed at.

One of the objects of my invention is to provide a method and means whereby a uniform rate of coking of the entire coal charge is effected by arranging the burning points of the combustibles, gas and air, at different heights above the bottoms of the flues, and preferably altering the position of such burning points, so as to regulate, in a vertical direction, the amount of heat delivered to different portions of the heating walls, by the combustibles.

Another object of the invention is to provide a method and means of securing a fine regulation of the uniformity of heating of the entire charge by altering the calorific value of the combustibles used to supply the burners for heating the oven, between reversals of the oven.

Another object of the invention is to provide for the further regulation of uniformity of coking by varying the burning time of the individual burning points, so that the period during which gas and air is supplied to the burners of one height will bear a predetermined relation to the period of time during which gas and air is supplied to the burners of a different height, and so that such predetermined relation may be varied in accordance with the heating requirements of the oven.

Although the means for realizing my process and for embodying my invention may differ, some of the devices preferable for carrying out my new process will be described in the following specification with reference to the accompanying drawings which form part thereof.

On these drawings:

Figs. 1 and 2 refer to the first embodiment, Figs. 3 to 5 to the second, Figs. 6 to 8 to the third, Figs. 9 and 10 to the fourth, Figs. 11 and 12 to the fifth, Figs. 13 and 14 to the sixth, Figs. 15 and 16 to the seventh, Fig. 17 to the eighth embodiment of my invention, and in particular:

Fig. 1 shows the vertical section of a burning of a heating wall at the burning point.

Fig. 2 shows, in reduced scale, the arrangement of the individual burning points within a heating wall;

Fig. 3 is a vertical section, corresponding to Fig. 1, on line III—III of Fig. 4.

Fig. 4 is a horizontal section through the flues above the burning points on line IV—IV of Fig. 3, Fig. 5 is a vertical section, corresponding to Fig. 2, on line V—V of Fig. 4, Fig. 6 is a vertical section, corresponding to Fig. 3, on line VI—VI of Fig. 7, Fig. 7 is a horizontal section, corresponding to Fig. 4, on line VII—VII of Fig. 6, Fig. 8 is a vertical section, corresponding to Fig. 5, on line VIII—VIII of Fig. 7, Fig. 9 is a vertical section through a burner-brick on line IX—IX of Fig. 10, Fig. 10 is the appurtenant top view;

Fig. 11 and Fig. 12 are section and top view corresponding to Figs. 9 and 10, respectively, Figs. 13 and 14 are likewise section and top view corresponding to Figs. 9 and 10;

Fig. 15 is a vertical section, corresponding to Fig. 5, on line XV—XV of Fig. 16, Fig. 16 is a horizontal section, corresponding to Fig. 4, on line XVI—XVI of Fig. 15, Fig. 17 is a vertical section corresponding to Fig. 15.

Referring first to the embodiment to wit: The process and apparatus illustrated in Figs. 1 and 2, 1 denotes the nozzle-bricks which are stationarily arranged in the usual way on the lower end of the flues 2, which, as shown, are of the same height, the passage 3 of brick 1, being enlarged on the top. This enlarged portion 3$^a$ of passage 3 is adapted to receive a tubular prolongation 4 with passage 3$^b$ forming the proper burner and having a restricted portion 4$^a$ engaging 3$^a$, the burner being put into place and removed or replaced by a shorter or longer one as desired from the top 5 of the oven through an opening 6 in the brickwork. Air for combustion is supplied through passages 7 fitting into the flues 2 at their lower end. It is to be seen that the level where the combustion takes place can thus be altered within one and the same heating wall, according to different requirements, such as those conditioned by the kind of coal being coked or the kind of gas being used to heat the oven. It will often be advisable to position the admission openings of the burners in the middle portion of the oven higher than at the ends thereof, as shown in Fig. 2.

While the described embodiment is suitably adapted to be employed with half-divided ovens, that means ovens in which, alternately, in one half of each heating wall the heating media arise and in the other half descend, the embodiment shown in Figs. 3 to 5 is preferably adapted for ovens equipped with hair-pin heating flues. In this embodiment 8 denotes the chambers of the oven arranged between the heating walls which are subdivided so as to form said hair-pin flues 2$^a$, 2$^b$. As shown, the two burners of each hair-pin flue are arranged at different levels above the bottom of the heating flue, the higher burner 9 being arranged in the starting flue 2$^a$ while the lower burners 10 are arranged in the end flue of each hair-pin flue. Air is supplied to the flues 2$^a$ and 2$^b$ through passages 7 which are connected to the regenerator 11. The conduits supplying gas to the burners 9 and 10 are connected at 12 and 13 to the stationary nozzle-bricks 1 and 1$^a$. The latter may be joined to the appurtenant burner tubes 4, 4$^b$ by mortar, or said tubes may be mounted loosely thereon and form exchangeable elements, as described with respect to the first embodiment. As shown in the drawing, the burner tubes 4, 4$^b$ may be surrounded by the masonry of the flues nearly up to their top, they may, however, be constructed, as specified in my pending patent application of burner flue for coke ovens, Serial Number 17,101/1925, so as to form freely standing tubular burners projecting into the flues. This latter form of embodiment is preferably adapted in case the hair pin oven is a so-called compound-oven that means is designed for selective or common heating by strong and weak gas. In this case each flue is connected both to a weak-gas-regenerator and an air-regenerator.

A refined embodiment of one of the constructions of Figs. 1 to 5 by means of which my process may be carried out is illustrated in Figs. 6 to 8, two or more burners differing in level above the bottom of the flue being provided in this embodiment within each flue. This arrangement enables one to displace, as desired, the highest heating effect into upper or lower flue-portions in each flue within a very short time, so that the oven is able, to a degree not attained hitherto, to be adapted to the unequal and varying requirements of heat of its individual portions, necessary to produce a uniform rate of coking of the entire charge. In this example 8 denotes the coking chambers arranged each in the usual way between the heating walls which, in their turn, are subdivided so as to form a plurality of vertical flues 2. Each flue 2 comprises two nozzle-bricks 1 and 1$^a$ for strong gas, which are connected by the conduits 12, 13 to the main gas conduit. The air for combustion is supplied from the regenerator 11 through passages 7. The supply of gas to the higher bricks 1 and to the lower bricks 1$^a$ may be effected by selectively connecting by a two-way damper the appurtenant pipes 12 and 13 to the conduit supplying the strong gas. Another possibility of supplying the gas is given by connecting on the one hand all the nozzle-bricks 1 by their pipes 12 and all the nozzle-bricks 1ª on the other hand by their pipes 13 each to a special supply conduit branched from the main gas conduit, a damper likewise being provided to selectively connect said branches to said main conduit. This second embodiment offers the advantage that the gas supply can be turned over at once from the higher to the lower burners by one single turning movement of the damper and vice-versa. In contradistinction thereto the first-described embodiment enables one to so operate each flue 2, independently of the other flues, so that the higher or lower burners are fed. In this case, however, as many adjustments of the damper are needed as flues exist.

As illustrated, the nozzle-bricks 1, 1ª may be arranged immediately beside one another and in close connection to the flue-walls 14; they may, however, also be constructed to form freely standing tubular burner elements which project into the flues, as described in my pending patent application of burner flue for coke ovens Serial Number 17,101/25. Furthermore, the abovementioned exchangeable tubular prolongations 4, 4ª may be provided on the top of the bricks 1, 1ª, as likewise shown in the drawing.

It will be understood without explanation that the above-described method of heating coke ovens and the burner arrangement are also adapted to be used in compound ovens heated selectively or in common with strong and weak gas. In this case the regenerators must be subdivided in a well-known manner into weak gas-regenerators and air-regenerators and each flue must be connected both to a gas regenerator and an air regenerator.

Besides my method and the described burner arrangement are adapted to be used both in coke ovens of various systems of gas supply, as recuperative and regenerative ovens, and with any system of subdivision of the heating walls, viz, into halves, or several groups of heating flues or hair-pin flues.

Some preferred forms of embodiment of the exchangeable burners 4 are illustrated in Figs. 9 to 14.

The burner shown in Figs. 9 and 10 comprises one or more prismatic or cylindrical hollow nozzle-bricks 15 each of which has a recess 16 at one end and a corresponding enlargement 17 at its other end. A throttling disk 18 having a suitable bore 19 may be put into the enlargement of the uppermost brick, see Figs. 9 and 10.

Figs. 11 and 12 show another form of the uppermost brick, of the burner. In this brick 20 the enlargement 17 is dispensed with and its upper edge is suitably rounded off. The throttling of the gas passing through the central longitudinal channel 21 may be effected in this case by inserting a plug 23 having a suitable bore 22.

A further embodiment of the burner is illustrated in Figs. 13 and 14, this embodiment being preferably adapted to be used with the arrangement of Figs. 6 to 8. Here a stationary nozzle-brick 1 or 1ª (not shown) carries an intermediate brick 24 having a lower recess 16 and an upper enlargement 17 similar to those of the bricks 15 and 20 shown in Figs. 9 to 12. As shown in Fig. 13, the bore 25 of the brick 24 bifurcates towards its top, the two branches 26 and 27 being disposed concentrically with respect to the enlargements 17. According to whether the gas is to escape through the branch 26 or 27, the respective enlargement 17 is covered by a plug or throttled by a throttling disk 18. Each enlargement 17 of the intermediate brick 24 may further receive bricks 15 and 20, respectively, by means of recesses 16.

The use of the described intermediate bricks 24 offers the advantage that a plurality of exit openings for the gas, for instance two openings, can be provided, one of which is situated but little above the bottom of the flue, while the other can be arranged at any desired level, by simply inserting a corresponding number of bricks 15 and 20, respectively. The quantity of gas escaping through these burners may be regulated by throttling disks or plugs, as described.

The above-mentioned stationary brick 1 or 1ª (not shown) is preferably likewise provided with an enlargement like 3ª of Fig. 1 and corresponding to the recess 16, so that the burner formed by the individual bricks 15 or 20, respectively, constitutes an integral piece of comparatively high stability. Of course, the individual bricks may be walled up together, thus giving up the exchangeability, so as to form a complete burner tube 4 or 4ª, this tube being mounted loosely on or jointed by mortar to said stationary brick 1 or 1ª, as above explained.

A further realization of the idea of my invention is illustrated in Figs. 15 to 17, two or more burners differing in level being provided here in each flue like the embodiment of Figs. 6 to 8. Like to this last-embodied idea of the invention the regulation of the heating power of the walls is effected here by supplying the gas to the flues at different levels through pipes or passages lodged in the partitions between the heating flues. This arrangement likewise enables one to displace as desired and within a very short time, the greater heating effect in each flue into upper or lower portions thereof, so that the oven can be adapted in the most perfect manner to the unequal and varying requirements of heat.

One or more conduits or passages 27, 27ª provided within the partitions 14 between the heating flues 2 serve to supply the gas, burner openings 28, 28ª connecting said passages 27, 27ª to the neighboring flues 2. The number of burner openings depends on the height of the oven. In the embodiment shown two burner openings 28, 28ª are provided, the arrangement being such that each passage 27, 27ª has allotted to it two burner openings 28, 28ª at different level above the bottom of the flues. The passages 27 and 27ª are connected each to an individual supply conduit branched off from the main gas conduit. The supply of gas to all the burners may be regulated from said main conduit. A fine regulation of the individual burners is effected by fitting pieces 29 inserted from above into the passages 27, 27ª.

Another way of regulation may consist in connecting to all the passages 27 the lower burner openings 28 and to all the passages 27ª the upper burner openings 28ª. Owing to the fact that each of the passages 27, 27ª is able to be controlled individually from the main gas conduit, this arrangement offers the advantage that the upper or lower burners can be thrown into or out of operation as required.

The operation of the oven takes place as indicated by full line arrows in Fig. 15, the gas for instance rising in the passages of every second partition and entering the flues 2 through the burner openings 28, 28ª. In the flues the gas burns in upward direction together with the air supplied from below from the regenerators 11. The products of combustion descend in the neighboring flue. Upon reversal, the operation takes place in the direction of the dotted arrows.

In an analogous manner is effected the heating of the half-divided oven illustrated in Fig. 17. In the lefthand half of this figure every second partition 14 comprises one or more passages 27, 27ª (27ª not shown in Fig. 17) and burner openings 28, 28ª connecting them with two neighboring flues 2, while in the righthand half the burner openings 28, 28ª of each passage 27, 27ª are in connection each merely with one of the neighboring flues 2. In this latter case the heating of the oven can be regulated in a simpler manner, the stability of the oven, however, is somewhat weakened due to the double number of passages in the partitions since each partition is in the latter case provided with passages. It will be understood that this kind of heating is not limited to half-divided ovens, but can be made use of with any subdivision of groups of flues of the oven.

As it will be seen from the drawing, all the burner openings 28 are arranged at the same level, while all the burner openings 28ª are situated at another common level above the flue-bottom. The burner openings, however, may be also arranged at different levels in the individual flues. The openings 28, 28ª of the partitions of an even number for instance, may be staggered in level with respect to the openings 28, 28ª of the partitions of odd numbers. When a plurality of passages 27, 27ª is provided, the openings of one of them may be staggered relatively to those of the other pipes. This offers a means for regulating the heating effect of the portions of the wall in consideration within a great range.

All the embodiments hereinbefore described fulfil the conditions of the leading idea of my invention, viz, to regulate the heating effect of the upper or lower portions of each heating wall by arranging the individual burning points of each wall at different levels which preferably can be altered as desired. This alteration of the level is effected in the embodiment of Figs. 1 to 14 by mounting, on a stationary nozzle-brick, exchangeable tubular nozzle-prolongations of different length, and in the embodiments of Figs. 15 to 17 by supplying the gas from the partitions between the flues through burner openings which are arranged at different levels above the bottom of the flues.

It will be understood without any further detailed explanation that but a coarse regulation of the heating effect of the individual portions of a wall can be obtained by the described means. Therefore an improvement of my present invention consists in creating, in some measure, besides said coarse regulation of the heating power, a fine regulation thereof. Such a fine regulation is important especially in case the composition of the used heating gases does not vary too much, so that a flame of approximately uniform length is produced. Now, the object aimed at, of such a fine regulation is obtained according to my invention by varying the calorific value of the combustible (gas and air), supplied between two reversals of the oven to the portions of the wall situated above each individual burning point.

This variation of the calorific value of the gas and air mixture may be obtained in different manners, for instance by altering the composition of the mixture. To this end the higher and lower gas admissions, respectively, may be calibrated differently, that is, by regulating the calorific value of the gas and air supplied to the burners of one height in predetermined relation to the calorific value of the gas and air supplied to the burners of a different height, so that while the upper openings are in operation, a larger quantity of gas will be burned, or inversely. The composition of the mixture may further be altered by throttling the air for combustion or by raising the gas pressure between two reversals of the oven. When gases of different composition and, consequently, of different calorific value are at one's disposal, the kind of gas may be changed at every reversal, the calorific value of the gas and air mixture being thus altered.

Another method and means for obtaining said fine regulation is given by varying the burning time of the individual burning places, gas and air being supplied to the upper burners for instance for a longer time than to the lower burners. A larger quantity of gas will thus leave the upper burners between two reversals and a correspondingly higher calorific value of the mixture will be attained during this burning period.

Of course, the well-known regulation of the heating effect of the wall portions in horizontal direction may be handled independently of the described fine regulation of the calorific value of the gas and air supplied to the wall portions situated above each burner between two reversals.

To this end the wall portions situated near the doors may be permanently heated in a somewhat higher degree, owing to their higher radiation of heat, for instance by dimensioning the appurtenant gas and air passages somewhat larger than those leading to the inner wall portions.

Having thus described my invention, it may be understood that changes may be made in carrying the invention into effect, without departing from the principle thereof.

What I claim and desire to secure by Letters Patent is:

1. The method of heating coke ovens, provided with heating walls each of which is subdivided into a plurality of vertical heating flues, the soles of said flues being on the same level, which comprises regulating in a vertical direction the amount of heat delivered to the different portions of the heating walls by admitting fuel gas and air to the flues, starting burning thereof of the gas in the vertical flues at different heights above the soles of said flues and below the tops of the flues and altering the heights where the combustion starts.

2. The method of heating coke ovens, provided with heating walls each of which is subdivided into a plurality of vertical heating flues, the soles of said flues being on the same level which comprises regulating in a vertical direction the amount of heat delivered to the different portions of the heating walls, by admitting fuel gas and air to the flues, starting burning thereof of the gas in some of the vertical flues at one level above the soles and below the tops of the flues, reversing the oven and starting the combustion in other flues at a higher level, above the soles than the first named flues.

3. The method of heating coke ovens, provided with heating walls each of which is subdivided into a plurality of vertical heating flues, the soles of said flues being on the same level, which comprises admitting fuel gas and air to the flues starting combustion thereof in the vertical flues at different heights above the soles and below the tops of the flues, and reversing at intervals the direction of flow of the fuel gas and air and regulating, between said reversals, the calorific value of said fuel gas, thereby regulating in a vertical direction, the amount of heat delivered to the different portions of said heating walls.

4. The method of heating coke ovens provided with heating walls each of which is subdivided into a plurality of vertical heating flues, the soles of said flues being on the same level which comprises regulating in a vertical direction, the amount of heat delivered to the different portions of the heating flues by admitting fuel gas and air to the flues, starting combustion thereof in the vertical flues at different heights above the bottoms and below the tops of the flues, and altering the heights where the combustion takes place, reversing at intervals, the direction of flow of the gas and air and regulating between reversals the calorific value of said fuel gas.

5. The method of heating coke ovens provided with heating walls each of which is subdivided into a plurality of vertical heating flues, the soles of said flues being on the same level, which comprises admitting fuel gas and air to the flues, starting combustion thereof at different heights above the bottoms and below the tops of said flues and regulating the calorific value of the fuel gas supplied to the burners of one height in relation to the calorific value of the fuel gas supplied to the burners of a different height, thereby regulating in a vertical direction the amount of heat delivered to the different portions of said heating wall.

6. The method of heating coke ovens, provided with heating walls each of which is subdivided into a plurality of vertical heating flues, the soles of said flues being on the same level, which comprises regulating in a vertical direction the amount of heat delivered to the different portions of said heating walls, by admitting fuel gas and air to the flues, starting combustion thereof at different heights above the bottoms and below the tops of said flues, altering the heights where combustion takes place and regulating the calorific value of the fuel gas supplied to the burners of one height in relation to the calorific value of the fuel gas supplied to the burners of a different height.

7. The method of heating coke ovens, provided with heating walls each of which is subdivided into a plurality of vertical heating flues, the soles of said flues being on the same level, which comprises regulating in a vertical direction the amount of heat delivered to the different portions of said heating walls, by admitting fuel gas and air to the flues, starting combustion thereof at different heights above the bottoms and below the tops of said flues, reversing at intervals the direction of flow of the gas and air and throttling, between said reversals the air supplied to said flues.

8. The method of heating coke ovens, provided with heating walls each of which is subdivided into a plurality of vertical heating flues, the soles of said flues being on the same level, which comprises regulating in a vertical direction the amount of heat delivered to the different portions of said heating walls, by admitting fuel gas and air to the flues, starting combustion thereof in the vertical flues, at different heights above the bottoms of and below the tops of said flues, altering the heights where combustion takes place, reversing at intervals the direction of flow of the combustible gas and air and throttling, between said reversals, the air supplied to said flues.

9. The method of heating coke ovens, provided with heating walls each of which is subdivided into a plurality of vertical heating flues, the soles of said flues being on the same level, which comprises regulating in a vertical direction the amount of heat delivered to the different portions of said heating walls, by admitting fuel gas and air to the flues, starting combustion thereof in the vertical flues at different heights above the bottoms and below the tops of said heating flues, reversing at intervals, the direction of flow of the gas and air, and varying the pressure of the gas supply between reversals of the oven.

10. The method of heating coke ovens, provided with heating walls each of which is subdivided into a plurality of vertical heating flues, the soles of said flues being on the same level, which comprises regulating in a vertical direction the amount of heat delivered to the different portions of said heating walls, by admitting fuel gas and air to the flues, starting combustion thereof in the vertical flues at different heights above the bottoms and below the tops of said flues, altering the heights where combustion takes place, reversing at intervals the direction of flow of the gas and air and varying the pressure of the gas supply between reversals of the oven.

11. The method of heating coke ovens provided with heating walls each of which is subdivided into a plurality of vertical heating flues, the soles of said flues being on the same level, which comprises regulating in a vertical direction the amount of heat delivered to the different portions of the heating walls, by admitting fuel gas and air to the flues, starting combustion thereof in the vertical flues, at different heights above the bottoms and below the tops of said flues and in varying the burning time at the individual burning points.

12. The method of heating coke ovens, provided with heating walls each of which is subdivided into a plurality of vertical heating flues, the soles of said flues being on the same level, which comprises regulating in a vertical direction the amount of heat delivered to the different portions of the heating walls, by admitting fuel gas and air to the flues, starting combustion thereof in the vertical flues at different heights above the bottoms and below the tops of said flues, altering the heights where combustion takes place and varying the burning time at the individual burning points.

13. The method of heating coke ovens having an oven chamber and provided with a pair of horizontally extending heating walls arranged on two opposite sides thereof, each heating wall being subdivided into a plurality of vertical flues, the soles of the flues of the walls being all on the same level, which comprises admitting fuel gas to and starting burning thereof within one of the vertical flues above the soles and below the tops of the flues, and admitting fuel gas to and starting burning within another vertical flue higher up above the soles and below the tops of the flues than the first named flue of said heating wall, thereby regulating in a vertical direction the amount of heat delivered to the oven chamber.

In testimony whereof, I have signed my name to this specification.

CARL OTTO.